United States Patent [19]

Valentin

[11] Patent Number: 5,161,654
[45] Date of Patent: Nov. 10, 1992

[54] FRICTION LINING FOR DISK BRAKES, MORE PARTICULARLY FOR ROAD VEHICLES AND RAIL VEHICLES

[75] Inventor: Wolfgang Valentin, Glinde, Fed. Rep. of Germany

[73] Assignee: Jurid Werke GmbH, Glinde, Fed. Rep. of Germany

[21] Appl. No.: 636,917

[22] Filed: Jan. 2, 1991

[30] Foreign Application Priority Data

Feb. 14, 1990 [DE] Fed. Rep. of Germany ... 9001709[U]
Nov. 26, 1990 [EP] European Pat. Off. ............ 90122522

[51] Int. Cl.⁵ .............................................. F16D 69/04
[52] U.S. Cl. ................. 188/251 R; 188/73.1; 192/107 M
[58] Field of Search ................. 188/73.1, 73.2, 250 G, 188/251 R, 251 A, 251 M, 255, 256, 258; 192/107 M

[56] References Cited

U.S. PATENT DOCUMENTS

| | | | |
|---|---|---|---|
| 1,557,668 | 10/1925 | De France | 188/251 R X |
| 4,022,302 | 5/1977 | Jonsson | 188/73.1 |
| 4,799,579 | 1/1989 | Myers et al. | 188/250 G X |
| 4,976,800 | 12/1990 | Edwards | 188/251 A X |

FOREIGN PATENT DOCUMENTS

| | | | |
|---|---|---|---|
| 515600 | 8/1954 | Belgium . | |
| 0056918 | 8/1982 | European Pat. Off. . | |
| 84591 | 8/1983 | European Pat. Off. | 188/73.1 |
| 0100888 | 2/1984 | European Pat. Off. . | |
| 0254827 | 2/1988 | European Pat. Off. . | |
| 0396493 | 11/1990 | European Pat. Off. . | |
| 2928572 | 1/1981 | Fed. Rep. of Germany . | |
| 71896 | 2/1960 | France . | |
| 155935 | 12/1980 | Japan | 188/250 G |
| 80531 | 7/1981 | Japan | 188/251 A |
| 86244 | 7/1981 | Japan | 188/73.1 |
| 6037431 | 2/1985 | Japan . | |
| 127532 | 6/1987 | Japan | 188/251 A |

Primary Examiner—George E. A. Halvosa
Attorney, Agent, or Firm—Anderson Kill Olick & Oshinsky

[57] ABSTRACT

The friction lining for disk brakes comprises a carrier plate (10) and a block (16) of a compressed friction material secured to the latter, wherein the carrier plate, on the side bearing the block of friction material, is provided with a sinter-fused mounting bed (12) for the block of friction material of individual shaped members (13) forming frictional and positive connections with the block of friction material, in which, prior to the block of friction material is pressed onto the carrier plate (10) with the mounting bed sinter-fused thereupon, a galvanically, thermally or in some other suitable way produced metallic coating (50) is applied to the carrier plate as a corrosion protection.

13 Claims, 5 Drawing Sheets

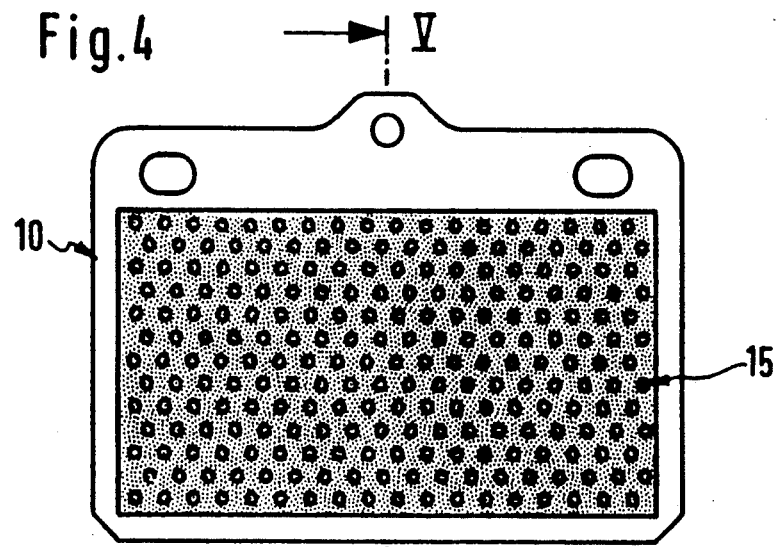
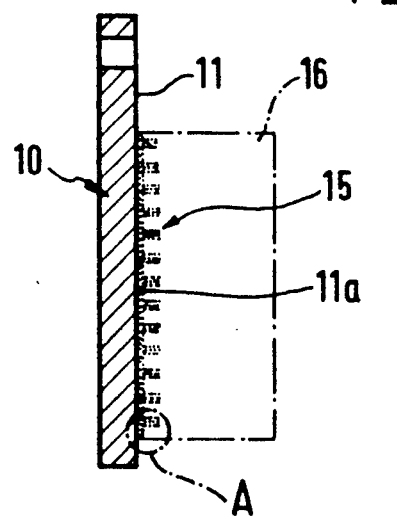
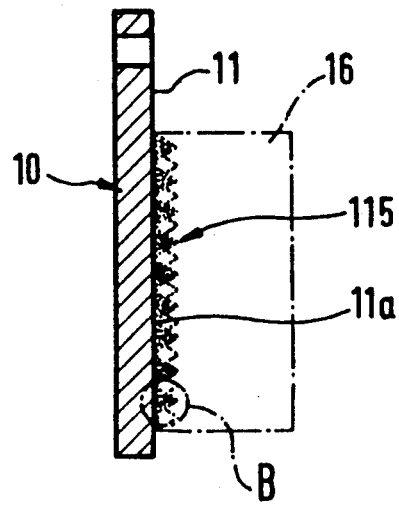
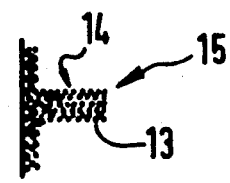
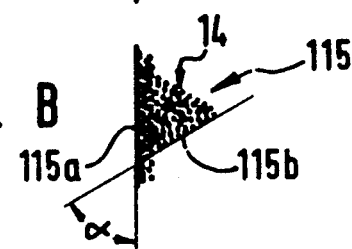

FRICTION LINING FOR DISK BRAKES, MORE PARTICULARLY FOR ROAD VEHICLES AND RAIL VEHICLES

SUMMARY OF THE INVENTION

The present invention proceeds from a friction lining for disk brakes, more particularly for road vehicles and rail vehicles, which is constructed in one or several parts and which comprises a block of a compressed frictional material attached to a carrier plate or carrier metal sheet, in which the carrier plate, on the side which bears the block of friction material, is provided with a sinter-fused mounting or supporting bed of individual shaped members forming frictional and positive connections with the block of friction material with undercut portions and constricted or recessed portions or the like, and wherein the pressed-on friction material is attached to the mounting bed in the form of a block while filling in the undercut portions, constricted portions or the like of the individual shaped members.

A brake lining of this type is known from European Patent No. 84,591. Friction linings of this kind which already have proved their worth in practical application for a long time, often additionally require the use of an intermediate layer between the mounting bed and the block of friction material. This intermediate layer has up to now been constructed in the form of a bonding film or adhesive, it is, however, subject to various disadvantages so that it is desirable to provide a possibility of dispensing with this intermediate layer. It has been shown, furthermore, that, between the known mounting beds and the carrier plate or between the mounting bed and the block of friction material, crack formation and/or corrosion can occur so that an underfilm rusting of the block of friction material may occur in a creeping manner from the side which could lead to an impairment of the barking effect and—in the extreme case—to a failure of the brake lining.

In the manufacture of brake linings, the bonding of the friction material to the carrier plate, due to the thermal treatment of the adhesive agent, calls for relatively long inoperative periods which results in a low production output. These inoperative periods are necessary in order to achieve a good bonding of the friction material to the carrier plate. If these inoperative periods are shortened, then poorly bonded connections are obtained since the heat transmission through the adhesive is not complete. To this is added the circumstance that, when adhesives are employed, the carrier plate must be pretreated. It has to be provided with either a polished adhesion surface or with a rough base upon which the adhesive is then applied. It is known, furthermore, subsequent to the friction material having been pressed onto the carrier plate, to provide the same with a layer of varnish extending as far as into the lateral area of the block of friction material. In this process step, special precautionary steps have to be taken for the protection of the varnish sprayer or operator of the varnish spraying equipment. However, the quantities of residual and no-longer-usable varnish produced in the spraying operation are considerable and represent a disposal system. In addition, great demands are made on the layers of varnish to be applied. However, all these process steps do not result in an adequate corrosion protection of the carrier plate fabricated from iron or steel. Also attempts aimed at improving the corrosion control by a preceding galvanization of the carrier plate did fail inasmuch as a galvanic metal coating on a smooth carrier plate does not constitute an adequate adhesion base for an adhesive; the adhesive does not adhere to an e.g. zinc-coated metal sheet.

That is why the invention solves the technical problem of providing a friction lining of the type stated in the beginning in which, despite the application of a galvanic metal coating or of some other appropriate coating on the carrier plate or carrier metal sheet, an adequate adhesion between the friction material and the carrier metal sheet is achieved with a concurrent improvement of the corrosion protection of the carrier metal sheet or plate. In addition, it is intended to achieve that the carrier plate will possess a reduced proneness to fissurization while, at the same time, the noise reduction is intended to be retained or improved.

SUMMARY OF THE INVENTION

This technical problem is solved by the features characterized in the claims 1 and 2.

Surprisingly it was discovered that the disadvantages resulting from the application of layers of varnish are avoided when, prior to the friction material being pressed onto the rough base of the carrier plate, a galvanic metal coating is applied which is comprised of copper, silver, tin, cadmium zinc, chromium or some other suitable material, in which case it is also possible for a coating of a high-temperature-resistant plastic, such as, for instance, trifluoroethylene, polytetrafluoroethylene, polysiloxane or silicone rubber to be applied. The interaction of the rough base (mounting bed) and the galvanic coating leads to a high degree of corrosion protection of the carrier plate, while the rough base brings about the adhesion between the friction material and the carrier metal sheet since the galvanic coating follows the contour progression of the rough base. In this manner an environmentally compatible method for the production of friction linings is provided. To this is added the circumstance that the manufacturing method for friction linings is improved and simplified. Protracted inoperative periods in the strip production of friction linings, contingent upon the curing or hardening times of the adhesive or due to the drying time of the layers of varnish, are dispensed with.

It is proposed, moreover, to provide in a friction lining of the type stated in the beginning that the mounting or supporting bed be comprised of a material mixture made up of a component (A) having a low melting point and a component (B) having a higher melting point.

By the employment of this mixture for the construction of the mounting bed in the form of a structure—of shaped members fabricated from the mixture which form frictional and positive connections with undercut portions and constricted or recessed portions or the like, it is possible for the structural surface to possess a completely bizarre and irregular structure, and this both in the macrostrucure as well as in the microstructure relative to the sinter-fused particles, so that each individual sinter-fused shaped member, in comparison with the already known spherical surface, has a larger surface area without, however, possessing a spherical configuration. Hereby a very great mechanical strength and a high temperature stability are obtained, which results in a powerful adhesion and great adhesion safety of the block of friction material on the carrier plate.

According to advantageous embodiments, provision is made in this case for the low-melting component (A) to be a metal possessing a low melting point, such as tin, soft or quick solder or the like, or an alloy having a low melting point, such as bronze, brass or the like, and for the higher-melting component (B) to be comprised of iron, sand, ceramic powder or the like, in which connection the melting point of the higher-melting component (B) should be below the melting point of the carrier metal sheet. The carrier metal sheet or carrier plate is comprised of steel, V2A-steel (a nickel-chromium steel), ceramic material, aluminum or of other suitable materials. While the component (A) is low-melting, the melting points of component (B) and also that of the material of the carrier plate have to be high; they may vary or be the same. Notwithstanding the galvanic metal coating, a direct transition of both force and heat from the block of friction material onto the sinter-fused material bed and, thereby, onto the carrier plate, is possible. An additional connecting layer is dispensed with. Especially when bronze is employed, an underfilm rusting and initial rusting is avoided so that the service life is extended and the proneness to corrosion is reduced even in extreme environmental conditions.

Added to this is the circumstance that such a fiction lining, due to the employment of the combination material, possesses optimal emergency running properties within the area of the sinter-fused mounting bed. On the one hand, by virtue of the bizarre surface structure within the contact area of the brake disks, a mixture material is in constant contact with the brake disk, so that it is possible to still carry out a braking operation with the remainder of the friction material portion. A brake disk protection is provided at the same time since, due to the combination material used, it is possible to avoid a destruction of the brake disk. That is why, by means of this structure, a powerful adhesion and friction are provided right to the very end so that emergency running qualities do exist. A shearing-off of the residual lining is not possible owing to the existing interlocking between the bizarre structure of the structural surface with the block of friction material, in which connection the safety is additionally increased due to the circumstance than an underfilm rusting can be avoided with certainty.

It is also possible to use such a friction lining without through bores (perforations) in the carrier plate, which up to now have been provided for the purpose of a possible check because safety exists to the very end. The greater rigidity achieved thereby permits a thinning of the carrier plate while retaining the same strength, which results in a lowering of the weight.

It has been shown further that the structural surface used possesses the additional advantage that, between the block of friction material and the sinter-fused mounting plate, with the undercut and constricted or recessed portions being very largely filled in by the friction material, small air pockets are produced which provide the materials with the possibility of expanding into the thus arising cavities so that occurring thermal stresses are reduced. Hereby an additional conservation of the friction lining and an improvement in the service life is brought about.

According to a preferred embodiment, provision is made for the low-melting component (A) to comprise approximately 30% bronze and for the higher-melting component (B) to comprise approximately 70% iron powder, while the bronze used should have a proportion of 10% tin. When making use of such a mixture, an optimal result with regard to all the desired properties, such as resistance to wear, noise reduction and corrosion control is obtained.

By preference provision is made for the sinter-fused mounting bed to comprise a basic layer covering the carrier plate within the area of the friction material accommodation fully or partially comprised of individual shaped members forming a frictional and positive connection which are provided with undercut portions, constricted portions, etc. In this case the gripping elements may be constructed in the form of cylindrical columns, frusto-conical columns, in the form of a genuine truncated cone or also in the form of a pyramid having a triangular, square or polygonal base, while the individual gripping elements are in each case dispaced spaced apart from each other. The selection of the type of the gripping elements employed depends on the desired properties of the friction lining. While a columnar construction of the gripping elements leads to the proportion between mounting bed material and friction material remaining relatively constant even in the case of increasing wear, when employing other forms of gripping elements, the proportion of the mounting bed material is increased so that it is possible here to achieve a decreasing wear so that, even when the friction lining is subjected to great stress, the braking qualities are maintained between two inspections.

For the manufacture of such a friction material, a method is provided in which, prior to the friction material being pressed onto the carrier plate with the sinter-fused mounting bed on the same, as a corrosion protection of the carrier plate, a galvanically produced metallic coating of copper, silver, tin, cadmium, zinc, chromium or some other suitable metal or a coating of a high-temperature-resistant platic is applied.

A further method consists in that, while use is made of a carrier plate known per se, by means of the sinter-fusing of a suitable material, a mounting bed is constructed, provision being made for a powdery mixture of one component (A) having a low melting point and one component (B) having a higher melting point is prepared and the powder is passed across a strainer or across a perforated plate which rests upon the carrier plate, the strainer is lifted off so that small heaps of powder of the mixture then remain on the carrier plate and the sintering operation is subsequently carried out, or the powder is inserted into a graphite mold provided with a number of blind end bores expanding conically toward the blind end bore openings, the carrier plate then being placed upon the side of the graphite mold which is provided with the blind end bore openings and the sintering is subsequently effected, or the powder is applied to a pattern plate into which a number of grooves having preferably a triangular cross-section are recessed, with the grooves proceeding in the transverse and longitudinal direction as well as intersecting each other so that the mixture powder can be applied onto the carrier plate by being spread in a honeycomb lattice pattern, the carrier plate being then placed upon the side of the pattern plate bearing the grooves and the sintering operation is subsequently carried out.

The following is achieved by this manufacturing method:

a) A bizarre structure of the sinter-fused particles, in which each sinter body possesses—in comparison with a spherical surface—a larger surface without, however, possessing a spherical configuration;

b) A great mechanical strength and temperature resistance;
c) A powerful adhesion;
d) Good emergency running qualities due to the employment of an adhesion bed possessing emergency running properties, and
e) A lower crack formation due to the employment of only a few layers.

In lieu of the proposed graphite mold with the blind end bores, it is also possible to make use of a mold fabricated from some other suitable material which possesses good gliding properties. The individual blind end bores expand conically in the direction of the blind end bore opening. It is also possible to make use of molds provided with perforations which are subsequently closed on one side and this with the aid of a plate carrying appropriate pins, said pins engaging into the perforations. The dosing of the quantity of powder in each perforation is effected to the extent to which the pins are inserted into the perforations relative to their lengths. An accurate dosing and construction of the gripping elements is rendered possible thereby. In this case the optimal material qualities are achieved by the combined action of the mixture provided with an appropriate thermal treatment within the framework of the sintering process since the bizarre structure is created by the differing melting points in interaction with the temperature and the pressure treatment.

In order to endow the mounting bed with friction material qualities, provision may be made for the mounting bed, apart from the component (A) and the component (B), to possess a component (C) of carbon. In the process, the friction value is adjusted by the carbon component.

Further advantageous embodiments and further developments of the invention are characterized in the subclaims.

BRIEF DESCRIPTION OF THE DRAWINGS

Embodiment examples of the invention are explained below in greater detail with the aid of the drawings. Thus:

FIG. 4 shows, in a view from the top, a carrier plate with a further embodiment of the applied mounting bed;

FIG. 5 shows a vertical section in the direction of line V—V in FIG. 4;

FIG. 6 shows, in a sectional representation according to FIG. 5, a further embodiment of the applied mounting bed;

DETAILED DESCRIPTION OF THE PREFERRED EMBODIMENT

Figure 1:
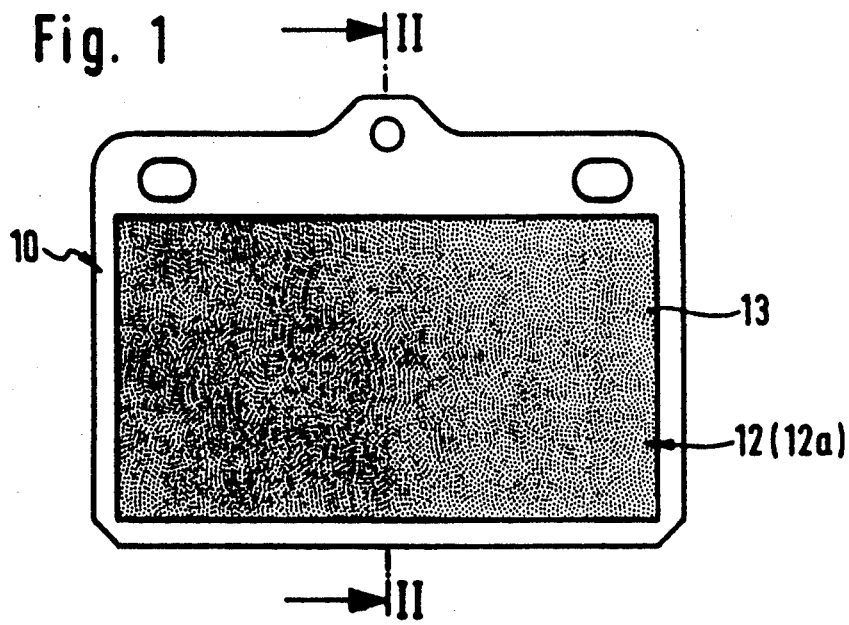
FIG. 1 shows, in a view from the top, a carrier plate with a mounting bed applied thereupon.

In the FIGS. 1 thru 5, a carrier plate or carrier metal sheet constructed in a manner known per se fabricated from metallic or other suitable materials is identified with 10, on which a merely indicated block 16 of a compressed mixture of friction material is mounted. In the embodiment as per FIGS. 1 and 2, the carrier metal sheet 10, on the side 11 which bears the friction material 16, is provided with a mounting bed 12 in the form of a structurally constructed surface which comprises a basic layer 12a of shaped members or elements 13 which have been mixed, compressed and thermally treated from the material mixture comprising the higher-melting component and the lower-melting component in such a way that each individual shaped element 13 possesses undercut portions, constricted portions or the like 14.

Figure 3:
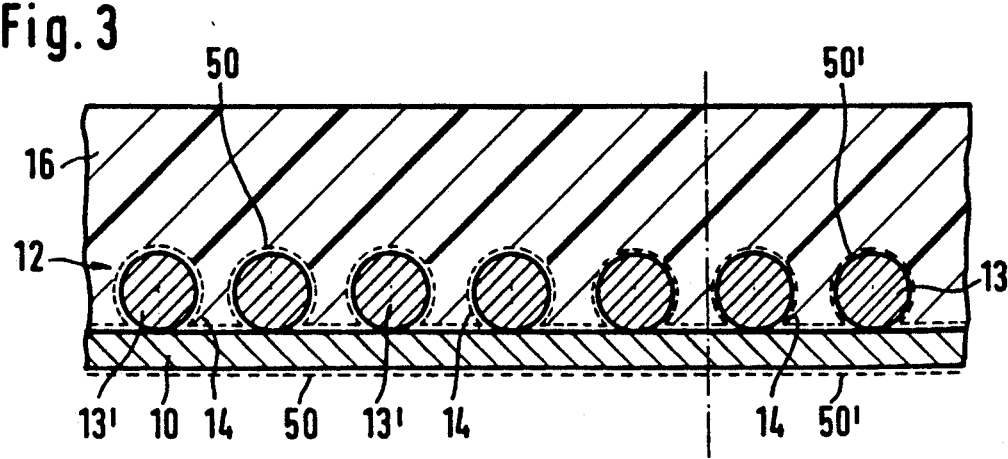
FIG. 3 shows, in an enlarged vertical section through a carrier plate with an applied mounting bed in the form of spherical shaped members.

In the embodiment example depicted in FIG. 3, the mounting bed 12 comprises spherical shaped members or elements 13' sinter-fused onto the carrier plate 10 which, within the attachment area, form undercut portions 14. Onto the mounting bed 12, a galvanic coating 50 of metal is applied which surrounds the individual shaped members 13' and which is adapted to the contours formed by the shaped members 13', while the coating 50 also follows the course of the undercut portions, constricted portions or the like 14, so that a continuous metallic coating is obtained; a good corrosion protection for the carrier sheet 10 is provided thereby. The metallic coating 50 may comprise copper, silver, tin, cadmium, zinc or some other suitable material. The further advantage produced by the galvanic metal coating resides in an exact dimensional accuracy relative to the thickness of the coating. This dimensional accuracy is not possible in either coatings comprising a varnish or in a powder coating. To this is added the circumstance that the metallic coating can be applied in a uniformity which cannot be achieved with other coating methods. In addition, the contours of the mounting bed 12 are fully preserved so that, despite the metallic coating 50 between the pressed-on friction material and the rough base, a high-level frictional and a high-level positive connection exists.

Besides a coating 50 of metallic materials, it is also possible to employ as a coating a plastic which possesses the same qualities. Such a coating is indicated in FIG. 3 with 50'. As plastics, particularly those are suited which are stable also at higher temperatures, thus e.g. silicone rubber, trifluoroethylene, polytetrafluoroethylene, polysiolxane and the like.

The mixture of friction material, with the aid of an appropriate molded member, is pressed upon the carrier metal sheet 10 provided with the mounting bed 12 in such a way that, during the pressing operation, the friction material mixture flows into the interspaces between the individual shaped members 13 (the bizarre surface of which is indicated in detail drawing C) as well as into those spaces which are formed by undercut portions, constricted portions or the like 14. In this way, with the aid of the shaped elements 13, an intimate bonding between the block 16 of friction material being deformed and the mounting bed 12, they clutch to each other in a manner of speaking, takes place. However, by virtue of the material properties, there also takes place such a deformation of the mounting bed 12 and of the basic layer 12a of the same so that the friction material acts upon the surface portions of the friction material accommodating area 11a not filled in by the mounting bed, so that a full-area filling of the friction material accommodating area 11a takes place with the result that here none or only a very small number of clear areas and free spaces results, whereby a penetration of moisture and the corrosion possibilities connected herewith are prevented.

Figure 2:
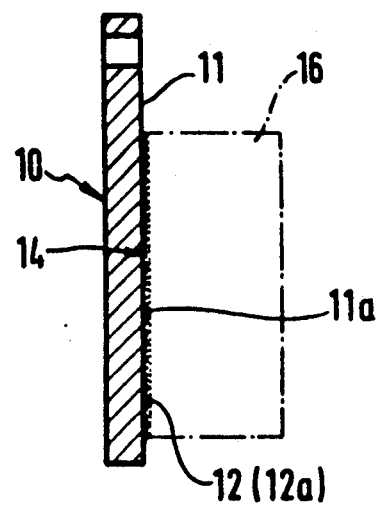
FIG. 2 shows a vertical section in the direction of line II—II in FIG. 1.

In the FIGS. 4 and 5, a further embodiment is depicted, the basic construction of which corresponds to that of the FIGS. 1 and 2 and in which, on the basic layer 12a, gripping elements 15 are formed in the shape of cylindrical or frustoconical columns or in the form of a truncated cone, as indicated in detail drawing A. In this case, in a macroview, the gripping elements 15 turn out in the form of columns while, in an enlargement depicted in greater detail with the aid of the following figures, it is shown that the gripping elements 15 are formed in the shape of bizarre structures possessing undercut portions, constricted portions and the like 14.

In FIG. 6, a further embodiment is shown, in which, in departure from FIG. 5, the gripping elements 115 are formed in the shape of pyramids having a triangular, square or polygonal base. In order to obtain optimal mounting and wearing properties in this case, provision is made here that the pyramid angle $\alpha$ between the pyramid base 115a and the pyramid side 115b amounts to approximately 60°, as indicated in detail drawing B.

Figure 7:
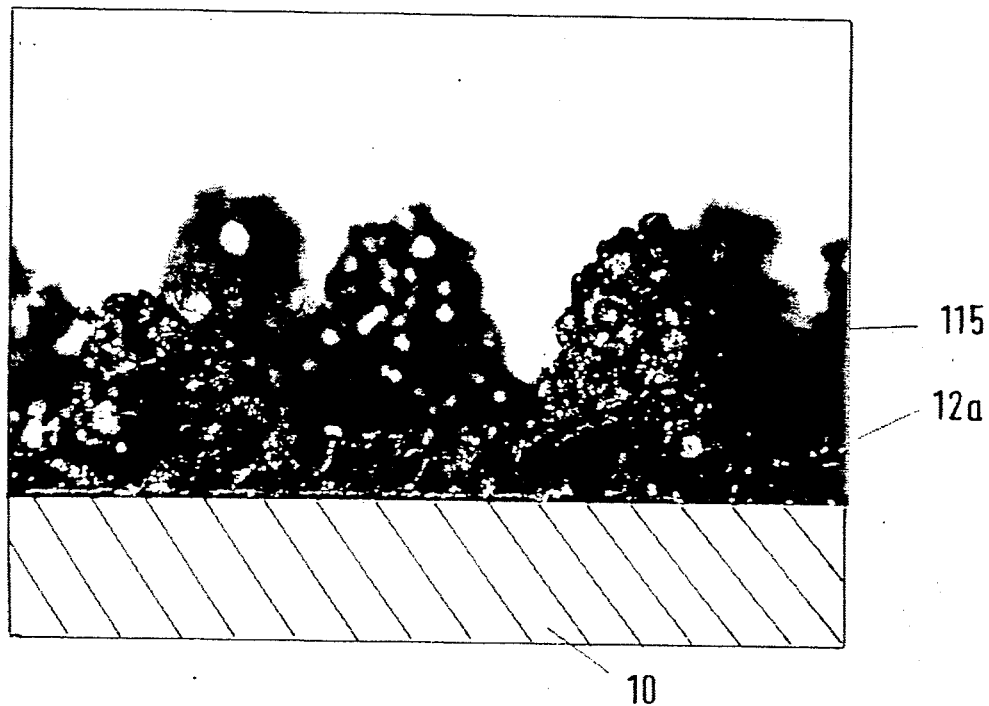
FIG. 7 shows, in a photographic representation, a microscopically magnified sectional view through a carrier plate with mounting bed according to FIG. 6.
Figure 8:
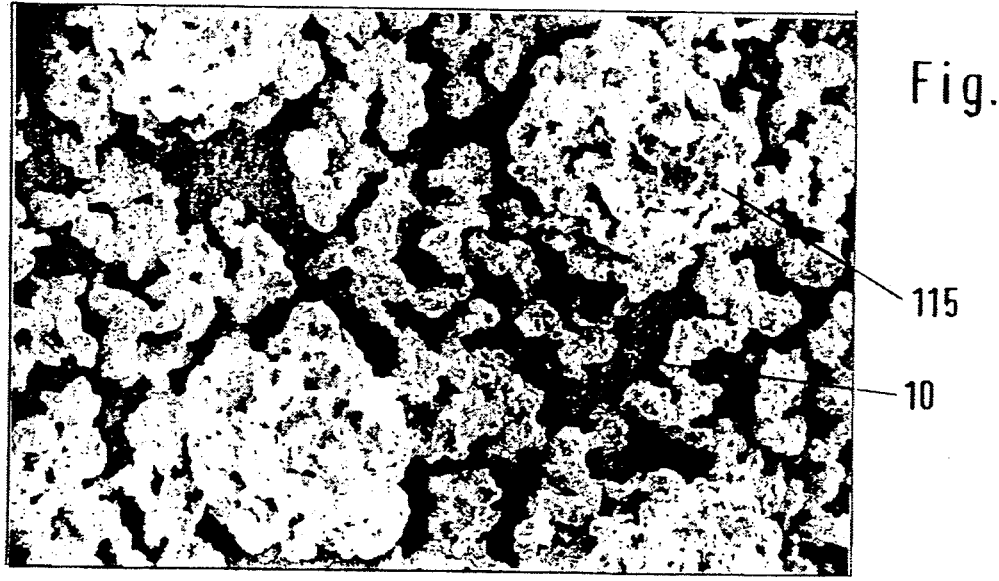
FIG. 8 shows, in a top view, the carrier plate according to FIG. 7.

In the FIGS. 7 and 8 it is illustrated with the aid of a cutout enlargement produced by an electron microscope how the bizarre structure of the basic layer 12a and of the gripping elements, by virtue of the material properties subsequent to having been sinter-fused in the form of a mounting bed, actually turn out.

Figure 9:
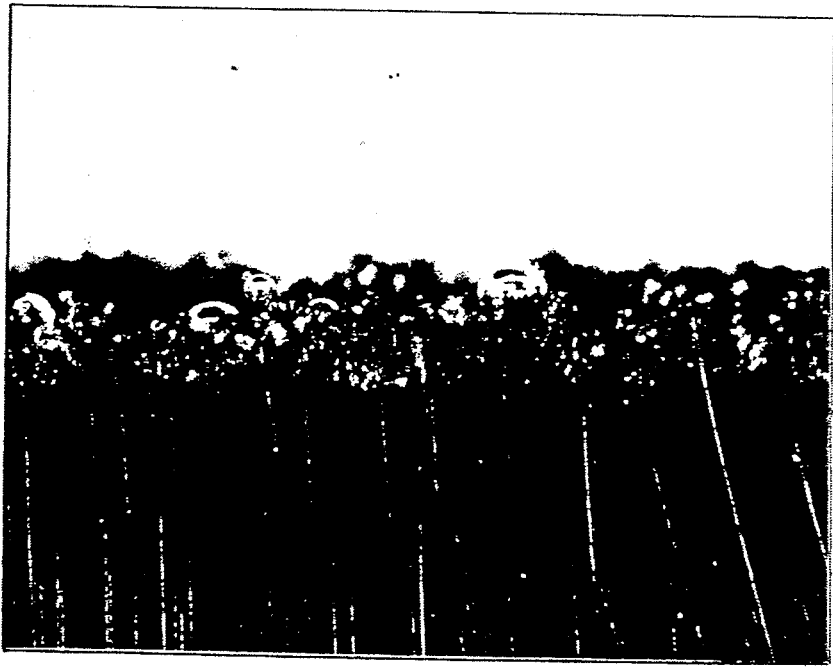
FIG. 9 shows, in a photographic representation, a microscopically magnified sectional view through a further embodiment of a carrier plate with a mounting bed applied thereupon in a lattice-like configuration.
Figure 10:
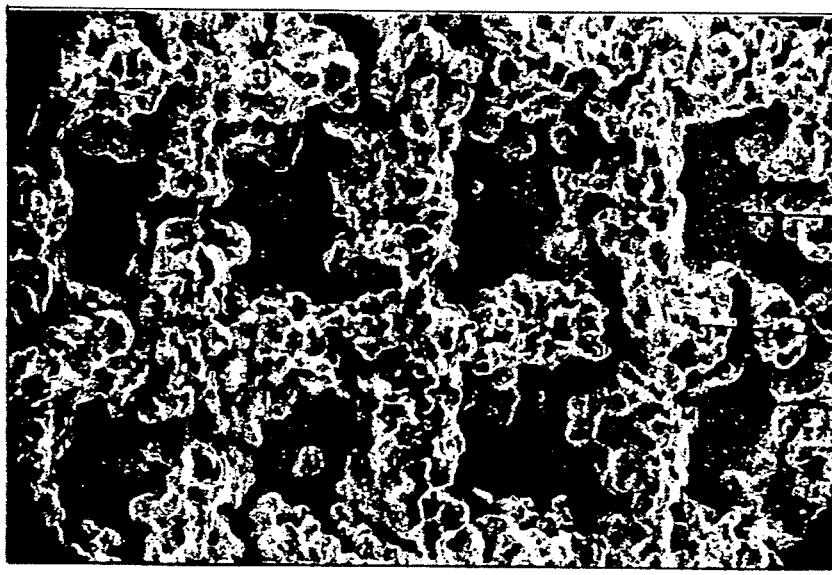
FIG. 10 shows, in a top view, the carrier plate according to FIG. 9.

In FIGS. 9 and 10, a further embodiment is shown, in which the sinter-fused mounting bed comprises lattice-like-disposed rows 17 of shaped elements, in which the individual gripping element sections 18 are superimposed at points of intersection 19 and form additional gripping element units there.

Figure 11:
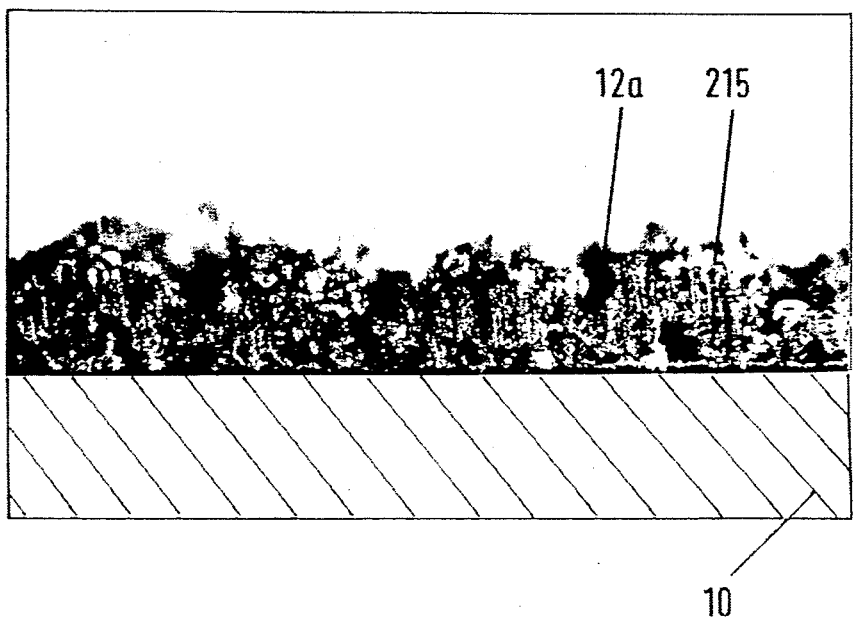
FIG. 11 shows, in a photographic representation, a microsccopically magnified sectional view through a further embodiment of a carrier plate with semi-elliptical gripping elements.
Figure 12:
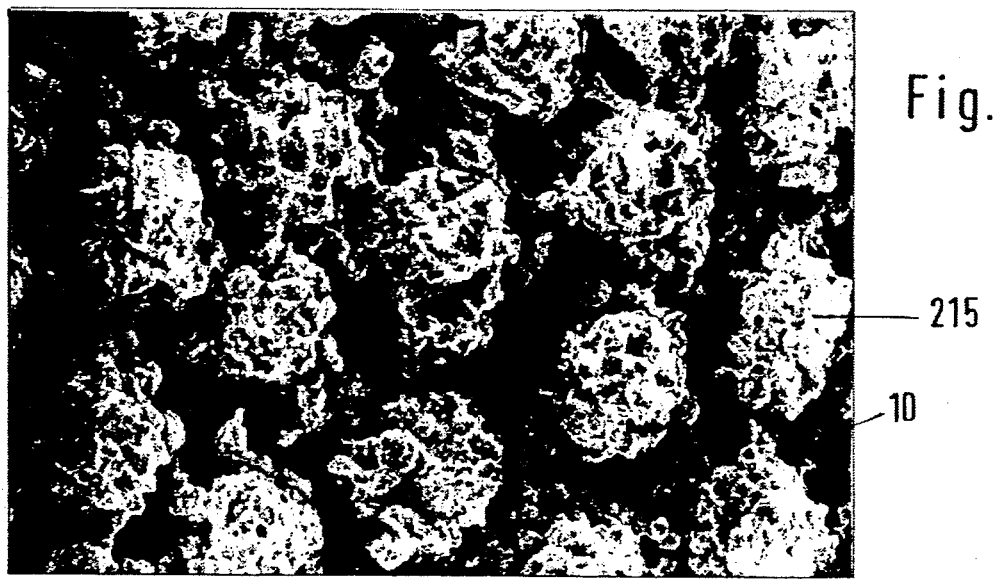
FIG. 12 shows, in a top view, the carrier plate according to FIG. 11.

In the FIGS. 11 and 12, likewise in a microscopically magnified representation, the construction of a mounting bed is depicted as results approximately in an embodiment according to FIGS. 1 and 2, in which, on the basic layer, gripping elements possessing an approximately hemispherical or semielliptical basic configuration are formed.

The actual embodiments depicted in the FIGS. 7 thru 12 have to be regarded as mere embodiment examples since, when making use of the mixture of the material components according to the invention for the mounting bed and/or while employing the method according to the invention, any structural surfaces whatever which possess the desired properties can be constructed.

The application of the metallic coating may be effected in a galvanic or thermal manner or by means of vacuum evaporation or cathode sputtering. The possibility also exists, prior to the roughing process or prior to the application of the mounting bed, of providing the carrier plate with a metallic coating, e.g. of copper. The rough base is then worked out of the metallic coating.

If the carrier plate 10 is comprised of a thin metal sheet, then the same is provided with a profile, e.g. ribbed, so that the inherent rigidity of the carrier plate 10 is increased.

What is claimed is:

1. Friction lining for disk brakes, more particularly for road vehicles and rail vehicles, which is constructed of at least one part and which comprises:
   a carrier plate (10);
   a block (16) of a compressed friction material pressed-on and attached to a side of the carrier plate (10);
   a sinter-fused mounting bed (12) provided on the side of the carrier plate bearing the block (16) of friction material, the sinter-fused mounting bed (12) being a rough base of individual shaped members (13) forming a frictional and positive connection with the friction material block with undercut portions, and constricted portions (14), the pressed-on friction material being attached to the mounting bed (12) so as to fill in undercut portions and constricted portions (14) of the individual shaped members (13); and
   a non-metallic coating (50) applied as a corrosion protection of the carrier plate (10) prior to the friction material being pressed onto the carrier plate (10) with the sinter-fused mounting bed (12), the mounting bed (12) being made up of a material mixture comprising a component (A) with a low melting point, a component (B) having a higher melting point, and a carbon component (C), the low-melting point component (A) being one of a low-melting metal and a low-melting alloy, the higher-melting point component (B) being one of iron, sand and ceramic powder, the melting point of the higher-melting component (B) lying below the melting point of the carrier plate (10), the carrier plate being made of one of steel, V2A-steel, a ceramic material and aluminum.

2. Friction lining for disk brakes, more particularly for road vehicles and rail vehicles, which is constructed of at least one part and which comprises:
   a carrier plate (10);
   a block (16) of a compressed friction material pressed-on and secured to a side of the carrier plate (10);
   a sinter-fused mounting bed (12) provided on the side of the carrier plate bearing the block (16) of friction material, the sinter-fused mounting bed (12) being a rough base of individual shaped members (13) forming frictional and positive connections with the friction material block and possessing undercut portions and constricted portions (14), the pressed-on friction material being attached to the mounting bed (12) so as to fill in the undercut portions and constricted portions (14) of the individual shaped members (13); and
   a metallic coating (50) applied to the mounting bed of the carrier plate as corrosion protection prior to the friction material being pressed onto the carrier plate (10), the metallic coating (50) comprising one of copper, silver, tin, cadmium, zinc and chromium, the mounting bed (12) being made up of a material mixture comprising a component (A) with a low melting point, a component (B) having a higher melting point, and a carbon component (C), the low-melting point component (A) being one of a low-melting metal and a low-melting alloy, the higher-melting point component (B) being one of iron, sand and ceramic powder, the melting point of the higher-melting component (B) lying below the melting point of the carrier plate (10), the carrier plate being made of one of steel, V2A-steel, a ceramic material and aluminum.

3. Friction lining according to claim 2, wherein the low-melting component (A) comprises approximately 30% bronze and the higher-melting component (B) comprises approximately 70% iron powder.

4. Friction lining according to claim 3, wherein the bronze used comprises a component of 10% tin.

5. Friction lining according to claim 2, wherein the sinter-fused mounting bed (12) comprises a basic layer (12a) which, within a friction material accommodating area (11a), covers the carrier plate (10) at least partially, the basic layer including individual shaped members (13) which form frictional and positive connections and are provided with one of undercut portions and constricted portions (14).

6. Friction lining according to claim 5, wherein gripping elements (15; 115,215) are disposed on the basic layer (12a) so as to be spaced apart from each other.

7. Friction layer according to claim 6, wherein each gripping element (15) is configured in the form of one of a cylindrical column, a frusto-conical column and a truncated cone.

8. Friction lining according to claim 7 wherein a cone angle ($\alpha$) between the base and one side amounts to approximately 60°.

9. Friction lining according to claim 6, wherein each gripping element (115) is configured in the form of a pyramid having one of a triangular base, a square base and a polygonal base.

10. Friction lining according to claim 9, wherein a pyramid angle ($\alpha$) between the base and one side amounts to approximately 60°.

11. Friction lining according to claim 2, wherein the sinter-fused mounting bed (12) comprises a basic layer (12a) applied to the carrier plate (10) within a friction material accommodation area (11a) so as to cover said area at least partially, the basic layer (12a) having lattice-like-disposed rows (17) formed thereupon with gripping element sections (18), the gripping element sections (18) comprising individual shaped members (13) possessing undercut portions and constricted portions (14).

12. Friction lining according to claim 2, wherein the component (A) is tin.

13. Friction lining according to claim 2, wherein the component (A) is one of bronze and brass.

* * * * *